United States Patent
Yao et al.

(10) Patent No.: US 9,708,720 B2
(45) Date of Patent: Jul. 18, 2017

(54) GAS GENERATION DEVICE

(71) Applicant: Central Glass Company, Limited, Ube-shi, Yamaguchi (JP)

(72) Inventors: Akifumi Yao, Ube (JP); Akiou Kikuchi, Ube (JP)

(73) Assignee: Central Glass Company, Limited, Ube-shi (JP)

( * ) Notice: Subject to any disclaimer, the term of this patent is extended or adjusted under 35 U.S.C. 154(b) by 0 days.

(21) Appl. No.: 14/370,708

(22) PCT Filed: Oct. 23, 2012

(86) PCT No.: PCT/JP2012/077285
§ 371 (c)(1),
(2) Date: Jul. 3, 2014

(87) PCT Pub. No.: WO2013/103041
PCT Pub. Date: Jul. 11, 2013

(65) Prior Publication Data
US 2015/0292092 A1    Oct. 15, 2015

(30) Foreign Application Priority Data
Jan. 5, 2012   (JP) .................................. 2012-000409

(51) Int. Cl.
*C25B 1/24* (2006.01)
*C25B 15/08* (2006.01)
(Continued)

(52) U.S. Cl.
CPC ................ *C25B 1/245* (2013.01); *C25B 1/02* (2013.01); *C25B 9/00* (2013.01); *C25B 15/08* (2013.01); *B01D 46/10* (2013.01); *B01D 46/30* (2013.01)

(58) Field of Classification Search
CPC .......... B01D 46/30; B01D 24/18; C25B 1/245
(Continued)

(56) References Cited

U.S. PATENT DOCUMENTS

| | | | | | |
|---|---|---|---|---|---|
| 4,379,750 A | * | 4/1983 | Tiggelbeck | ............ | B01D 15/00 210/232 |
| 5,948,252 A | * | 9/1999 | Takarabe | ............... | B01D 24/12 210/267 |

(Continued)

FOREIGN PATENT DOCUMENTS

| JP | 5-137922 A | 6/1993 |
|---|---|---|
| JP | 10-137512 A | 5/1998 |

(Continued)

OTHER PUBLICATIONS

Japanese Office Action issued in counterpart Japanese Application No. 2012-000409 dated Sep. 15, 2015 (Three (3) pages).

(Continued)

*Primary Examiner* — Harry D Wilkins, III
(74) *Attorney, Agent, or Firm* — Crowell & Moring LLP

(57) ABSTRACT

Disclosed is a gas generation device 100 that has a mist trap 50a equipped with a tubular housing 51, a gas inlet port 52 for allowing the gas generated from an electrolytic cell, a gas outlet port 53 for allowing the gas to flow out of the housing, a filler receiving section 58 that is positioned between the gas inlet port 52 and the gas outlet port 53 and receives a filler 56 for adsorbing mist and microparticles, and a gas diffusion section 57 that is positioned between the gas inlet port 52 and the filler receiving section 58 and is for diffusing the gas generated from the electrolytic cell 1 through the housing 51, that the gas outlet port 53 has a gas inlet tube 55 connecting to the interior of the housing 51, and that a gas (Continued)

entry portion 59 of the gas inlet tube 55 is arranged so as to be embedded in the filler 56 received in the filler receiving section 58.

2 Claims, 3 Drawing Sheets

(51) Int. Cl.
*B01D 46/30* (2006.01)
*C25B 9/00* (2006.01)
*C25B 1/02* (2006.01)
*B01D 46/10* (2006.01)

(58) Field of Classification Search
USPC ......................................................... 205/411
See application file for complete search history.

(56) References Cited

U.S. PATENT DOCUMENTS

| | | | | |
|---|---|---|---|---|
| 7,513,993 | B2* | 4/2009 | Goodwin ............. | B01D 24/105 |
| | | | | 210/167.13 |
| 2002/0044900 | A1* | 4/2002 | Otsuka .................. | B01D 46/10 |
| | | | | 423/210 |
| 2003/0047445 | A1* | 3/2003 | Tojo ........................ | C25B 15/02 |
| | | | | 204/243.1 |
| 2005/0132882 | A1* | 6/2005 | Hayakawa ............. | C25B 1/245 |
| | | | | 95/116 |
| 2005/0224366 | A1* | 10/2005 | Hodgson ................. | C25B 1/245 |
| | | | | 205/619 |
| 2006/0236867 | A1* | 10/2006 | Neary ................ | B01D 53/0415 |
| | | | | 96/121 |
| 2011/0174704 | A1 | 7/2011 | Yamada et al. | |
| 2011/0271833 | A1* | 11/2011 | Tentarelli ........... | B01D 53/0462 |
| | | | | 95/104 |
| 2012/0085640 | A1* | 4/2012 | Miyazaki ................ | C01B 7/195 |
| | | | | 204/247 |

FOREIGN PATENT DOCUMENTS

| | | |
|---|---|---|
| JP | 2000-325708 A | 11/2000 |
| JP | 2002-204916 A | 7/2002 |
| JP | 2003-105543 A | 4/2003 |
| JP | 2005-74362 A | 3/2005 |
| JP | 2005-179709 A | 7/2005 |
| JP | 2006-111900 A | 4/2006 |
| JP | 2007-307545 A | 11/2007 |
| JP | 2009-215588 A | 9/2009 |
| JP | 2011-169310 A | 9/2011 |
| WO | WO 2006/129481 A1 | 12/2006 |
| WO | WO 2009/125457 A1 | 10/2009 |
| WO | WO 2011/001744 A1 * | 1/2011 ............... C25B 1/24 |

OTHER PUBLICATIONS

International Search Report (PCT/ISA/210) dated Dec. 11, 2012, with English translation (Three (3) pages).

* cited by examiner

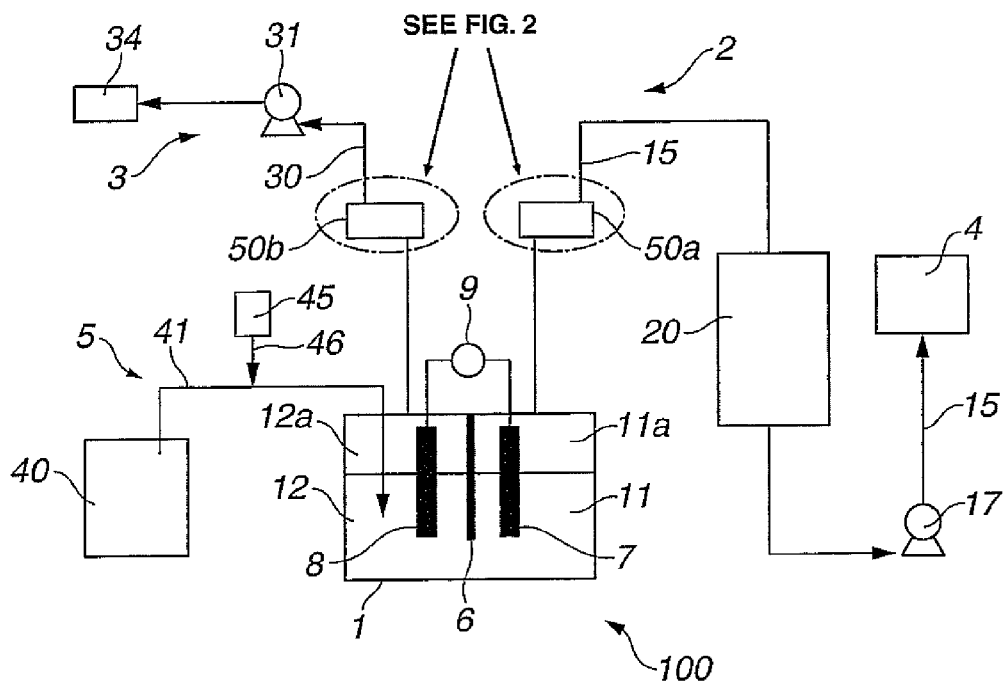
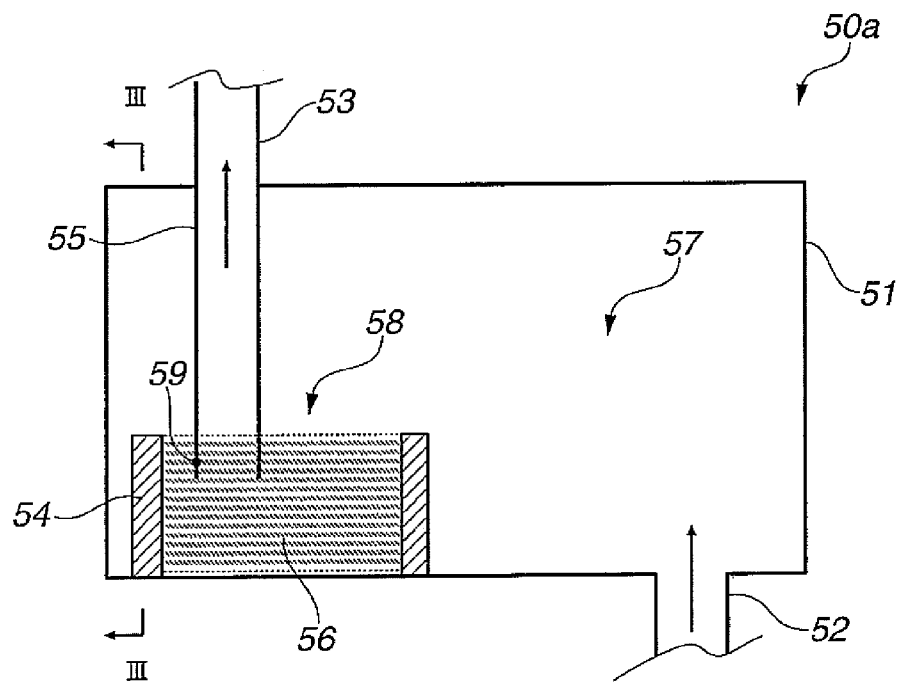

GAS GENERATION DEVICE

TECHNICAL FIELD

The present invention relates to a gas generation device capable of removing mist and microparticles, which accompany the gas generation and are derived from a molten salt.

BACKGROUND OF THE INVENTION

Hitherto, there has been known a fluorine gas generation device that is equipped with an electrolytic cell for electrolyzing hydrogen fluoride in an electrolytic bath formed of a molten salt containing hydrogen fluoride and that generates a main product gas containing fluorine gas as a main component on the anode side and a byproduct gas containing hydrogen gas as a main component on the cathode side.

In this type of fluorine gas generation device, a main product gas that is generated from the anode of the electrolytic cell and contains fluorine gas as a main component and a byproduct gas that is generated from the cathode and contains hydrogen gas as a main component are contaminated with hydrogen fluoride gas that has evaporated from the molten salt and at the same time are contaminated with a mist of the molten salt itself. Therefore, as it is used for a long time, there is a risk of having clogging of piping for taking out the main product gas or the byproduct gas.

As a technology for solving this problem, there is disclosed a technology of trapping the mist on a filter by putting the filter in the middle of the piping. For example, Patent Publication 1 discloses a technology in which a filter is put in the middle of the piping, a temperature regulating mechanism for regulating the temperature is installed in a portion of the piping, and the hydrogen fluoride gas liquefied by the temperature regulated portion is brought into contact with the filter put in the middle of the piping, thereby dissolving solid matter deposited on the filter surface to prevent the clogging and to making lifetime of the filter longer.

PRIOR ART PUBLICATIONS

Patent Publications

Patent Publication 1: Japanese Patent Application Publication 2006-111900

SUMMARY OF THE INVENTION

The gas generation device described in Patent Publication 1 provides a structure in which the filter is installed downstream of the temperature regulating mechanism installed in a portion of the piping, in which hydrogen fluoride liquefied by the temperature regulated portion is brought into contact with the filter installed downstream of the temperature regulating mechanism to dissolve a clogging substance attached to the filter, and in which furthermore the clogging substance causing clogging of the filter is made to remain in a waste liquid tank installed under the filter.

The gas generation device described in Patent Publication 1 is a superior gas generation device that contributes to making lifetime of the filter longer by dissolving the clogging substance attached to the filter by hydrogen fluoride to wash it down and storing the waste liquid below. In reality, however, it is difficult to make lifetime of the filter semi-permanently long, and it becomes necessary to conduct a maintenance operation, such as replacement of the piping, at a regular interval.

The structure of this type of device has essential requirements that a temperature regulating mechanism (e.g., a chiller using a heat medium) for liquefying hydrogen fluoride is provided and that a waste liquid tank for storing the waste liquid is provided. Therefore, there has been a problem in which the device has a large size and tends to become complicated to increase the running costs, such as production of the device and the electric power consumption.

The present invention was made in view of the above-mentioned problem. Its object is to provide a gas generation device capable of removing mist and microparticles, which accompany the gas generation and are derived from a molten salt, by a simple structure.

To solve the above-mentioned task, the present inventors have found that mist and microparticles, which accompany the gas generation and are derived from a molten salt, are removed by a simpler structure by using a mist trap having a particular structure and adsorbing mist and microparticles, which are derived from the molten salt, on a wall surface and into a filler using a space in the mist trap, thereby achieving the present invention.

The present invention is different from a concept of washing down the mist component by hydrogen fluoride, which is a countermeasure against clogging of the piping by the mist component derived from the molten salt in conventional fluorine gas generation devices, and is a totally different technological idea in which mist and microparticles derived from the molten salt are almost completely adsorbed by using a mist trap having a particular structure and efficiently utilizing a space in the mist trap.

That is, the present invention provides a gas generation device for generating a gas by electrolyzing hydrogen fluoride in a molten salt containing hydrogen fluoride, the gas generation device being characterized by that it is equipped with an electrolytic cell for generating a gas by electrolyzing hydrogen fluoride in an electrolytic bath formed of a molten salt containing hydrogen fluoride and a mist trap for removing mist and microparticles, which accompany the gas generation and are derived from the molten salt, that the mist trap has a tubular housing for allowing the gas to flow, a gas inlet port for allowing the gas generated from the electrolytic cell to flow in, a gas outlet port for allowing the gas to flow out of the housing, a filler receiving section that is positioned between the gas inlet port and the gas outlet port and receives a filler for adsorbing the mist and the microparticles, and a gas diffusion section that is positioned between the gas inlet port and the filler receiving section and is for diffusing the gas generated from the electrolytic cell through the housing, that the gas outlet port has a gas inlet tube communicating with the interior of the housing, and that a gas entry portion of the gas inlet tube is arranged so as to be embedded in the filler received in the filler receiving section.

Furthermore, in the present invention, it is optional to have a structure in which the housing has an elongate shape, and in which, in the longitudinal direction of the housing, the gas inlet port is formed to be closer to one edge surface portion of the housing, and the gas outlet port is formed to be closer to the other edge surface of the housing.

According to the present structure, it becomes possible to conduct the removal of mist and microparticles by efficiently utilizing the space in the mist trap.

Furthermore, in the present invention, the gas may be made up of a main product gas containing fluorine gas as a main component and a byproduct gas containing hydrogen gas as a main component, and it is optional to have a structure that is equipped with a main product gas mist trap for removing mist and microparticles of the main product gas and a byproduct gas mist trap for removing mist and microparticles of the byproduct gas and that the main product gas mist trap and the byproduct gas mist trap are combined into a single unit with an interposal of an edge surface portion of the housing.

According to the present structure, it is possible to make the mist traps of the main product gas and the byproduct gas smaller in size. This can contribute to making the gas generation device smaller in size.

Furthermore, in the present invention, it is also possible to have a structure in which the electrolytic cell and the mist trap are received in a single housing, to use it for a small-size, gas generation device.

Advantageous Effect of the Invention

According to the present invention, a diffusion section for diffusing mist and microparticles and a filler receiving section for adsorbing mist and microparticles are formed to efficiently utilize the space in the mist trap without causing clogging, resulting in a structure for positively adsorbing mist and microparticles derived from the molten salt. Therefore, it becomes possible to remove mist and microparticles derived from the molten salt by a simpler structure without providing a large-scale device such as a temperature regulating mechanism of piping, a waste liquid tank, etc.

BRIEF DESCRIPTION OF THE DRAWINGS

FIG. 1 is a system diagram of a gas generation device according to an embodiment of the present invention;

FIG. 2 is a schematic view of a mist trap according to an embodiment of the present invention;

DETAILED DESCRIPTION

Figure 3:
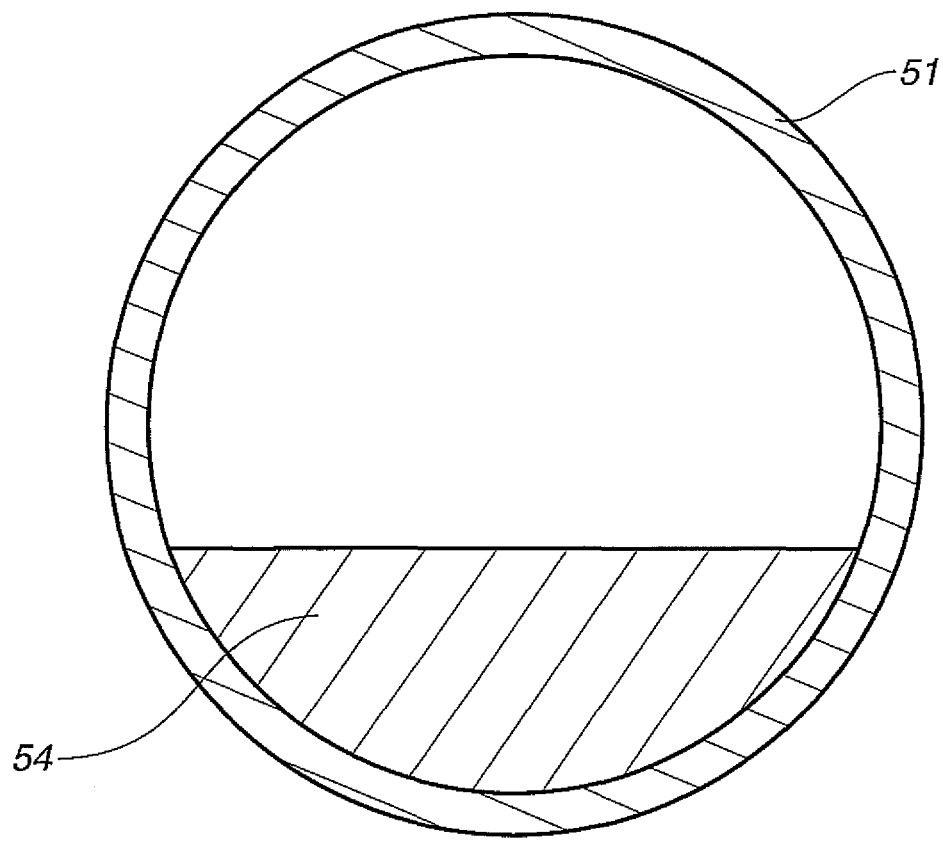
FIG. 3 is a sectional view of the mist trap, taken along the lines III-III of FIG. 2.

In the following, with reference to the drawings, an embodiment of the present invention is explained. With reference to FIG. 1, a fluorine gas generation device 100 according to an embodiment of the present invention is explained.

The gas generation device 100 is one for generating fluorine gas by electrolyzing a molten salt containing hydrogen fluoride and supplying the generated fluorine gas to an external device 4. The external device 4 is, for example, a semiconductor production device. In that case, fluorine gas is used, for example, as a cleaning gas in the semiconductor production step.

The gas generation device 100 is equipped with an electrolytic cell 1 for generating fluorine gas by electrolysis, a fluorine gas supply system 2 for supplying fluorine gas generated from the electrolytic cell 1 to the external device 4, and a byproduct gas treatment system 3 for treating a byproduct gas generated along with the generation of fluorine gas.

Firstly, the electrolytic cell 1 is explained. In the electrolytic cell 1, a molten salt containing hydrogen fluoride (HF) is stored. It is possible to suitably change composition of a fluorine compound gas generated from the electrolytic cell 1 by changing composition of the molten salt to be stored in the electrolytic cell 1. As the molten salt, there is used a composition represented by the general formula KF.nHF (n=0.5-5.0). In the case of using a $NH_4F.HF$ molten salt, nitrogen trifluoride ($NF_3$) is obtained. Alternatively, in the case of using a $NH_4F.KF.HF$ molten salt, a mixture of $F_2$ and $NF_3$ is obtained. In the following, in an embodiment of the present invention, an explanation is conducted by using a mixed molten salt (KF.2HF) of hydrogen fluoride and potassium fluoride.

The inside of the electrolytic cell 1 is divided into an anode chamber 11 and a cathode chamber 12 by a partition wall 6 immersed in the molten salt. Anode 7 and cathode 8 are respectively immersed in the molten salts of the anode chamber 11 and the cathode chamber 12. Electric current from a power source 9 is supplied between the anode 7 and the cathode 8, thereby generating at the anode 7 a main product gas containing fluorine gas ($F_2$) as a main component and generating at the cathode 8 a byproduct gas containing hydrogen gas ($H_2$) as a main component. As the anode 7, for example, a carbon electrode is used. For cathode 8, soft iron, Monel, or nickel is used.

On the surface of the molten salt liquid, a first gas chamber 11a, into which fluorine gas generated at the anode 7 is introduced, and a second gas chamber 12a, into which hydrogen gas generated at the cathode 8 is introduced, are divided by the partition wall 6 so that the respective gases are not able to communicate with each other. In this way, the first gas chamber 11a and the second gas chamber 12a are completely separated by the partition wall 6 in order to prevent a reaction due to a contact between fluorine gas and hydrogen gas. In contrast with this, the molten salts of the anode chamber 11 and the cathode chamber 12 are not separated by the partition wall 6, but communicate with each other through below the partition wall 6.

Since melting point of KF.2HF is 71.7° C., it is preferable that temperature of the molten salt is adjusted to 91 to 93° C. Each of the fluorine gas and the hydrogen gas generated from the anode 7 and the cathode 8 of the electrolytic cell 1 is contaminated with hydrogen fluoride vaporized from the molten salt according to vapor pressure. In this way, each of the fluorine gas which is generated at the anode 7 and introduced into the first gas chamber 11a and the hydrogen gas which is generated at the cathode 8 and introduced into the second gas chamber 12a contains hydrogen fluoride gas.

Next, the fluorine gas supply system 2 is explained. To the first gas chamber 11a, there is connected a first main passage 15 for supplying the fluorine gas to the external device 4. The first main passage 15 is provided with a mist trap 50a for removing mist and microparticles, which accompany the fluorine gas generation and are derived from the molten salt. The inside of the mist trap 50a is filled with a filler 56. The mist trap 50a is described in detail hereinafter.

The first main passage 15 is provided with a first pump 17 for allowing the fluorine gas to flow out of the first gas chamber 11a and carrying the same. As the first pump 17, there is used a displacement pump, such as bellows pump, diaphragm pump, etc. Upstream of the first pump 17 in the first main passage 15, there is provided a purification device 20 for purifying the fluorine gas by collecting hydrogen fluoride mixed in the fluorine gas.

The purification device is not particularly limited, as long as it can purify the fluorine gas by collecting hydrogen fluoride mixed in the fluorine gas. For example, it is possible to use a manner to use a treatment tower charged with an adsorbent such as sodium fluoride (NaF), a manner (low temperature purification method) of utilizing the difference of condensation point (boiling point) between the fluorine gas and a gas other than the fluorine gas component by cooling an outer wall of a purification reactor using a liquid argon, a liquid nitrogen under pressure, etc., and like manners.

Figure 4:
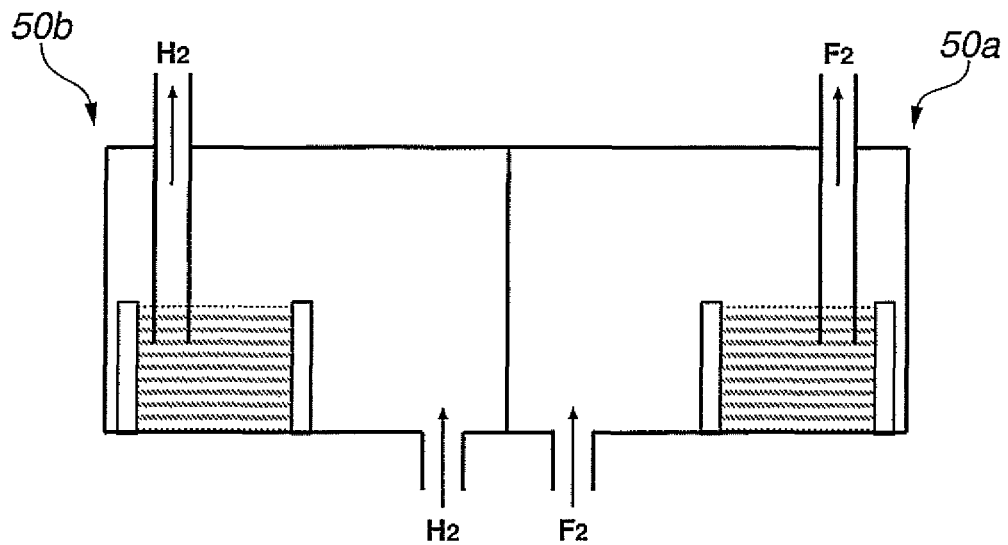
FIG. 4 is an another exemplary mist trap according to an embodiment of the present invention.

Next, the byproduct gas treatment system 3 is explained. To the second gas chamber 12*a*, there is connected a second main passage 30 for releasing the hydrogen gas to the outside. It is also possible to provide the second main passage 30 with a mist trap 50*b* having a structure similar to that of the mist trap 50*a* provided in the first main passage 15. As shown in FIG. 2 and FIG. 4, it is optional to have an embodiment in which the filler 56 is similarly received in the mist trap 50*b*, too.

The second main passage 30 is provided with a second pump 31 for allowing the hydrogen gas to flow out of the second gas chamber 12*a* and carrying the same. Downstream of the second pump 31 in the second main passage 30, there is provided a detoxification section 34. The hydrogen gas carried by the second pump 31 is subjected to an adsorptive removal of the hydrogen fluoride in the detoxification section 34 to be detoxified, and then is released.

The fluorine gas generation device 100 is also equipped with a raw material supply system 5 for supplying and adding hydrogen fluoride, which is the raw material of fluorine gas, to the molten salt of the electrolytic cell 1. In the following, the raw material supply system 5 is explained.

The electrolytic cell 1 is connected with a hydrogen fluoride supply source 40, in which hydrogen fluoride for replenishing the electrolytic cell 1 is stored, through a raw material supply passage 41. Hydrogen fluoride stored in the hydrogen fluoride supply source 40 is supplied into the molten salt of the electrolytic cell 1 through the raw material supply passage 41.

Furthermore, to the raw material supply passage 41, there is connected a carrier gas supply passage 46 for guiding a carrier gas, which is supplied from a carrier gas supply source 45, into the raw material supply passage 41. The carrier gas is a gas for guiding hydrogen fluoride from the hydrogen fluoride supply source 40 into the molten salt, and nitrogen gas as an inert gas is used therefor. Nitrogen gas is supplied together with hydrogen fluoride into the molten salt of the cathode chamber 12. It does almost not dissolve in the molten salt and is discharged from the second gas chamber 12*a* through the second main passage 30.

Next, as the first main passage 15 is taken as an example, the mist trap 50*a* is explained. The mist trap 50*a* is a device for removing mist and microparticles, which accompany the generation of fluorine gas and are derived from the molten salt. In the following, with reference to FIG. 2, the mist trap 50*a* of the present invention is explained in detail. FIG. 3 is a sectional view of the mist trap 50*a*, taken along the lines III-III of FIG. 2.

As shown in FIG. 2, the mist trap 50*a* is equipped with a tubular housing for allowing the gas to flow. To the housing 51, there are connected a gas inlet port 52 for guiding a main product gas containing as a main component a fluorine gas generated in the electrolytic cell 1, and a gas outlet port 53 for allowing a gas flowing in the housing 51 to flow out. Furthermore, in the inside of the housing 51, there are formed a gas diffusion section 57 for diffusing the main product gas, which has flowed in from the gas inlet port, and a filler receiving section 58 to receive the filler 56 for adsorbing mist and microparticles, which accompany the generation of the main product gas and are derived from the molten salt.

In the following, each structure of the mist trap 50*a* is explained in detail.

It is preferable that the housing 51 is a tubular member, which is arranged in the horizontal direction and has an elongate shape, and that, in the longitudinal direction of the housing 51, the gas inlet port 52 is formed to be closer to one edge surface portion of the housing 51, and the gas outlet port 53 is formed to be closer to the other edge surface of the housing 51. Furthermore, it is preferable to arrange the gas inlet port 52 and the gas outlet port 53 to have a positional relationship to be on the generally opposed surfaces of the housing. It is optional to form the gas inlet port 53 in a plural number.

The gas diffusion section 57 is formed in the vicinity of the gas inlet port 52 in the housing 51. It is a space for roughly removing mist and microparticles contained in the main product gas by staying and diffusing the main product gas flowing in from the gas inlet port 52. The diffused gas is brought into contact with an inner wall of the mist trap 51. With this, mist and microparticles are attached to the inner wall and thereby removed. It is optional to suitably install a gas diffusion plate, a baffle plate, etc. in the space of the gas diffusion section 57 for accelerating the staying and the diffusion of the main product gas.

The filler receiving section 58 is arranged in the vicinity of the gas outlet port 53 in the housing 51. It is equipped with the filler 56 for adsorbing mist and microparticles and a plurality of blocking plates 54 for holding and receiving the filler 56. As shown in the sectional view of FIG. 3, it is preferable that the blocking plate 54 has a shape (e.g., semicircular) to secure the flow of the gas in the housing 51 and is installed to make a partial surface go along the inner wall of the mist trap 51 to receive the filler 56.

The gas inlet port 52 is formed on the side of the electrolytic cell 1 in the first main passage 15. It is an inlet port for introducing the main product gas containing fluorine gas, which has been generated in the electrolytic cell 1, as a main component, into the housing 51. In the first main passage 15, downstream of the gas inlet port 52, it is optional to suitably form various regulating valves such as pressure regulating valve.

Under the gas outlet port 53, there is formed a gas inlet tube 55 communicating into the housing 51. The gas flowing in the housing 51 is allowed to flow out of the gas outlet port 53 through the gas inlet tube 55. Furthermore, a gas entry portion 59 of the gas inlet tube 55 is arranged so as to be embedded in the filler 56 received in the filler receiving section 58.

As material of the housing 51, the blocking plate 54, the gas inlet tube 55, etc., it is possible to use one having corrosion resistance against fluorine gas and hydrogen fluoride gas. For example, it is possible to cite materials, such as nickel, Monel, stainless steel, iron, copper, etc.

As the filler 56, it is possible to use general-purpose articles, such as Raschig ring, Paul ring, Tellerette, McMahon packing and Helipack, thin plates subjected to machining to have holes, unevenness, etc., ones in the form of wire netting, and a combination of these. As material of the filler 56, it is possible to use one having corrosion resistance against fluorine gas and hydrogen fluoride gas. For example, it is possible to cite materials, such as nickel, Monel, stainless steel, iron, copper, etc.

The above-mentioned embodiment brings about an advantageous effect shown in the following.

The filler receiving section 58 is positioned between the gas inlet port 52 and the gas outlet port 53, and the gas diffusion section 57 is positioned between the gas inlet port 52 and the filler receiving section 58. By this structure, in the mist trap 50*a*, there are formed a region (the first step) to roughly remove mist and microparticles by staying and diffusing the main product gas flowing in from the gas inlet port 52, and a region (the second step) to further remove mist and microparticles contained in the main product gas component subjected to going through the gas diffusion section 57 to conduct a rough removal step.

By the mist trap 50a of the present invention, mist and microparticles are partly removed prior to the contact of the main product gas with the filler 56. Therefore, it is possible in the filler receiving section 58 to prevent the gas flow from clogging caused by the attachment of too much mist and microparticles to the filler. Consequently, it becomes possible to positively adsorb and remove mist and microparticles derived from the molten salt by efficiently using a space in the mist trap to cause no clogging.

Furthermore, in the filler receiving section 58, the gas entry portion 59 of the gas inlet tube 55 provided under the gas outlet port 53 is arranged so as to be embedded in the filler 56 received in the filler receiving section 58. Therefore, it is possible to prevent the gas flowing in the housing 51 from flowing out of the gas outlet port 53 without contact with the filler 56. Furthermore, as compared with the case in which a pipe (e.g., the gas outlet port 53) for making the gas flow out is densely filled with the filler 56, it is possible to have a large area of a gas inflow section to the filler 56. Therefore, it is possible to have an efficient contact of the filler 56 with the gas in a large area. With this, clogging hardly occurs.

Other Modified Examples

Besides the above-mentioned embodiment of the present invention, as another modified example, it is optional to combine the mist trap 50a of the main product gas for removing mist and microparticles, which accompany the generation of fluorine gas and are derived from the molten salt, and the mist trap 50b of the byproduct gas for removing mist and microparticles, which accompany the generation of hydrogen gas and are derived from the molten salt, into a single unit.

As a method for combining the mist trap 50a of the main product gas and the mist trap 50b of the byproduct gas into a single unit, for example, as shown in FIG. 4, it suffices to combine them into a single unit at edge surface portions of their respective housings through flanges, etc. (not shown in the drawings).

In recent years, there has been a request for a small-size, gas generation device for generating fluorine gas. Thus, there has been a demand for smaller-size facilities and apparatuses constituting the gas generation device. The structure of the above-mentioned another modified example can greatly contribute to making the gas generation device 100 small in size by making the mist traps smaller.

Figure 5:
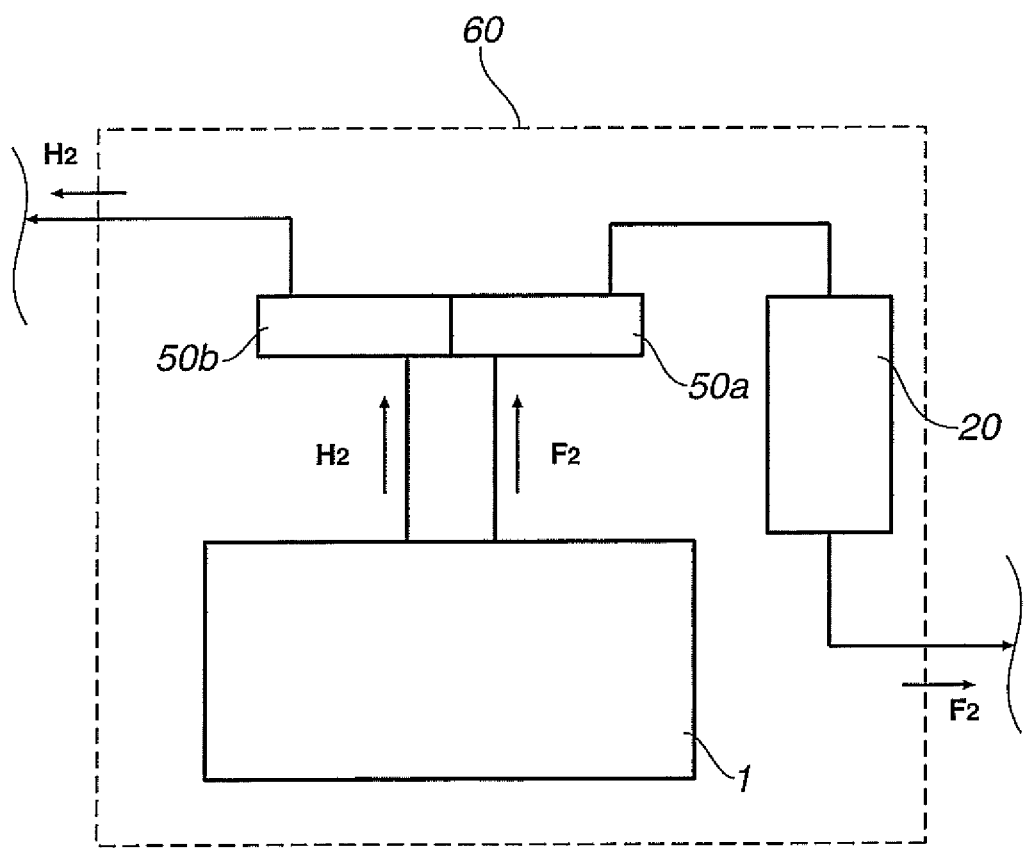
FIG. 5 shows an exemplary gas generation device in which mist traps and an electrolytic cell are received in a single housing.

For example, as shown in FIG. 5, it becomes easy to receive the mist trap 50a of the main product gas and the mist trap 50b of the byproduct gas, which have been combined into a single unit, and the electrolytic cell 1 in a single housing 60. With this, it becomes possible to make the gas generation device 100 small.

The present invention is not limited to the above-mentioned embodiment, but it is clear to be able to conduct various modifications to the extent of its technological idea.

EXPLANATION OF SYMBOLS

100: a gas generation device
1: an electrolytic cell
2: a fluorine gas supply system
3: a byproduct gas supply system
4: an external device
5: a raw material supply system
7: an anode
8: a cathode
11a: a first gas chamber
12a: a second gas chamber
15: a first main passage
17: a first pump
20: a purification device
30: a second main passage
31: a second pump
50a, 50b: mist traps
51: a housing
52: a gas inlet port
53: a gas outlet port
54: a blocking plate
55: a gas inlet tube
56: a filler
57: gas diffusion section
58: a filler receiving section
59: a gas entry portion
60: a housing

The invention claimed is:

1. A gas generation device for generating a gas by electrolyzing hydrogen fluoride in a molten salt containing hydrogen fluoride, the gas generation device comprises:
  an electrolytic cell for generating a gas by electrolyzing hydrogen fluoride in an electrolytic bath comprising a molten salt containing hydrogen fluoride and
  a mist trap for removing mist and microparticles, which accompany the gas generation and are derived from the molten salt,
  wherein the mist trap comprises:
  a tubular housing for allowing the gas generated from the electrolytic cell to flow,
  a gas inlet port for allowing the gas generated from the electrolytic cell to flow into the housing,
  a gas outlet port for allowing the gas, from which the mist and the microparticles have been removed, to flow out of the housing,
  a filler receiving section, that is positioned between the gas inlet port and the gas outlet port, for receiving a filler for adsorbing the mist and the microparticles, and
  a gas diffusion section, which is a space that is positioned between the gas inlet port and the filler receiving section, for diffusing the gas generated from the electrolytic cell through the housing, and for roughly removing the mist and the microparticles by attaching the mist and the microparticles to an inner wall of the housing,
  wherein the gas outlet port has a gas inlet tube connecting to the interior of the housing, and a gas entry portion of the gas inlet tube is embedded in the filler received in the filler receiving section, such that the gas flowing in the housing is allowed to flow out of the gas outlet port through the filler receiving section and then the gas inlet tube,
  wherein the housing is a tubular member arranged in a horizontal direction and having an elongate shape,
  wherein, in a longitudinal direction of the housing, the gas inlet port is formed to be closer to one edge surface portion of the housing, and the gas outlet port is formed to be closer to the other edge surface of the housing,
  wherein the filler receiving section is arranged in the vicinity of the gas outlet port, wherein, in a cross section perpendicular to the longitudinal direction of the housing, the filler receiving section has a cross-sectional area that is smaller than that of the housing, such that a flow of the gas in the housing is secured.

2. The gas generation device as claimed in claim 1, wherein the gas inlet port of the mist trap is arranged such that the gas is introduced from a bottom portion of the housing into the gas diffusion section, in a direction perpendicular to the longitudinal direction of the housing, and
wherein the gas inlet port and the gas outlet port of the mist trap are diagonally opposed to each other in a vertical section along the longitudinal direction of the housing.

* * * * *